UNITED STATES PATENT OFFICE.

MEINHARD HOFFMANN, OF MAINKUR, NEAR FRANKFORT-ON-THE-MAIN, ASSIGNOR TO LEOPOLD CASSELLA & CO., OF FRANKFORT-ON-THE-MAIN, GERMANY.

MANUFACTURE OF YELLOW DYES.

SPECIFICATION forming part of Letters Patent No. 472,121, dated April 5, 1892.

Application filed July 27, 1891. Serial No. 400,868. (Specimens.) Patented in France February 16, 1891, No. 182,063.

*To all whom it may concern:*

Be it known that I, MEINHARD HOFFMANN, a citizen of the Empire of Germany, and a resident of Mainkur, near Frankfort-on-the-Main, have invented certain new and useful Improvements in the Manufacture of New Yellow Coloring-Matter, (for which I have received a patent in France, No. 182,063, dated February 16, 1891,) of which the following is a specification.

The object of my invention is the preparation of a yellow coloring-matter which I have found in June, 1890. It is a derivative of the diamido beta-naphthaline disulpho-acid, which is prepared by double nitration and reduction of the naphthaline beta-disulpho-acid, as described in the United States Patent No. 464,566, and is obtained from the said diamido acid by combining its tetrazo derivative with phenol or cresol and treating the product with alkylated halogens.

In carrying out this invention I proceed as follows: Thirty-two kilograms of diamido naphthaline beta-disulpho-acid are transformed, by means of fourteen kilograms of nitrite, into the yellow difficultly-soluble tetrazo compound. Then I dissolve twenty kilograms of phenol in water, and, after having added sixty kilograms of carbonate of soda, I introduce the tetrazo compound. After twenty-four hours the formation of the dye-stuff is finished. It separates from the solution in form of a yellow precipitate, which is filtered off. This coloring-matter dyes unmordanted cotton in an alkaline bath, wool and silk in an acid or neutral bath, a brilliant yellow, which, however, is not quite fast against the influence of alkalies. This disagreeable property can be remedied by alkylating the free hydroxyl groups of the dye-stuff. For this purpose I dissolve fifty-three kilograms of the said coloring-matter with eight kilograms of caustic soda and a sufficient quantity of a spirit of fifty per cent. Then I add 12.8 kilograms of chloride of ethyl and heat in a closed vessel during ten hours to 60° to 80° centigrade. The ethylated compound, being more difficultly soluble in alkaline solution than the hydroxylated dye-stuff, separates from the solution in small yellow crystals. Its chemical constitution is—

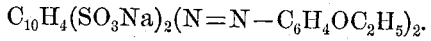

$$C_{10}H_4(SO_3Na)_2(N=N-C_6H_4OC_2H_5)_2.$$

Having thus described the nature of my invention, what I claim as new, and desire to secure by Letters Patent, is—

The yellow dye-stuff herein described, derived from tetrazo naphthaline beta-disulpho-acid and phenols, which is easily soluble in water, difficultly soluble in spirit, dissolving with a brilliant violet shade in strong sulphuric acid, from which, on diluting with some water, the free acid of the dye-stuff separates in the form of a dark-green precipitate, which, by further addition of water, is dissolved with a yellow shade.

In testimony that I claim the foregoing as my invention I have signed my name, in presence of two witnesses, this 6th day of July, 1891.

MEINHARD HOFFMANN.

Witnesses:
ALVESTO S. HOGUE,
JEAN GRUND.